United States Patent [19]

Watanabe et al.

[11] Patent Number: 4,525,258

[45] Date of Patent: Jun. 25, 1985

[54] RADIATION-CURABLE RESIN COMPOSITION

[75] Inventors: Shoji Watanabe; Kiyoshi Okitsu, both of Hiroshima, Japan

[73] Assignee: Daicel Chemical Industries, Ltd., Osaka, Japan

[21] Appl. No.: 464,253

[22] Filed: Feb. 7, 1983

[30] Foreign Application Priority Data

Feb. 5, 1982 [JP] Japan .................... 57-18004

[51] Int. Cl.³ ............... C08J 3/28; C08L 63/10; C08L 67/06; C08L 75/04
[52] U.S. Cl. ................ 204/159.23; 204/159.16; 204/159.19
[58] Field of Search ............. 204/159.16, 159.23

[56] References Cited

U.S. PATENT DOCUMENTS 3,700,643  10/1972  Smith et al. ............ 204/159.16
4,337,289   6/1982  Reed et al. ............. 204/159.16

FOREIGN PATENT DOCUMENTS 56-99215  8/1981  Japan ................ 204/159.16
2101121   1/1983  United Kingdom .

*Primary Examiner*—Allan M. Lieberman
*Attorney, Agent, or Firm*—Sughrue, Mion, Zinn, Macpeak and Seas

[57] ABSTRACT

A radiation-curable resin composition is disclosed. It comprises 0.1 to 10 parts by weight of a photosensitizer added to 100 parts by weight of a mixture of 40 to 95 wt % of a resin having a molecular weight of at least 300 and at least one ethylenically unsaturated group in the molecule and 60 to 5 wt % of ε-caprolactone modified 2-hydroxyethyl acrylate or methacrylate of the formula:

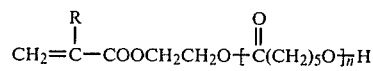

wherein
R = H or CH$_3$ and
n is 1 to 10.

The composition has a high boiling point, low viscosity and shows reduced skin irritation and rash capability without sacrificing its inherent radiation-curing capability.

7 Claims, No Drawings

RADIATION-CURABLE RESIN COMPOSITION

FIELD OF THE INVENTION

The present invention relates to a radiation-curable resin composition which has a high boiling point, a low viscosity and exhibits reduced skin irritation and rash capability without sacrificing its inherent radiation-curing capability.

BACKGROUND OF THE INVENTION

Radiation-curable resins having at least one ethylenically unsaturated group in their molecule, such as an unsaturated polyester resin, a polyurethane resin, an epoxy-acrylate resin and an unsaturated acrylate resin are extensively used in printing inks and paints. However, these resins have one great problem in that they do not have many compatible reactive diluents. Among currently used reactive diluents are high-boiling monoacrylates such as butyl acrylate, 2-ethylhexyl acrylate, 2-hydroxyethyl acrylate and isononyl acrylate, and polyacrylates of polyols such as neopentyl glycol diacrylate. However, these diluents are not completely satisfactory since they have a peculiar odor, irritate the skin or have other undesirable effects.

Reactive diluents suitable for use with resins having an ethylenically unsaturated group must meet the following requirements: (1) they do not irritate the skin; (2) they are highly miscible with the resin; (3) they have a high boiling point and do not evaporate easily; (4) they do not impair the radiation-curing capability of the resin; (5) they improve the film-forming property of the resin; (6) they have a low viscosity; and (7) they are inexpensive. However, no single currently available reactive diluent meets these requirements.

SUMMARY OF THE INVENTION

As a result of various studies to attain an improved radiation-curable resin composition, we found that ε-caprolactone modified 2-hydroxyethyl acrylate (or methacrylate) is useful as a reactive diluent for resins having a molecular weight of at least 300 and at least one ethylenically unsaturated group in the molecule thereof.

Therefore, the present invention relates to a radiation-curable resin composition comprising 0.1 to 10 parts by weight of a photosensitizer added to 100 parts by weight of a mixture of 40 to 95 wt% of a resin having a molecular weight of at least 300 and at least one ethylenically unsaturated group in the molecule thereof and 60 to 5 wt% of ε-caprolactone modified 2-hydroxyethyl acrylate (or methacrylate) of the formula:

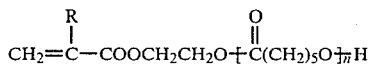

wherein
R=H or CH₃, and
n is 1 to 10.

DETAILED DESCRIPTION OF THE INVENTION

The radiation-curable resin composition of the present invention has various advantages: first, the ε-caprolactone modified 2-hydroxyethyl acrylate (or methacrylate) used as the reactive diluent has a higher boiling point than 2-hydroxyethyl acrylate (or methacrylate) so it will not evaporate during service; secondly, the modified hydroxyethyl acrylate (or methacrylate) is highly miscible with the resin having an ethylenically unsaturated group; thirdly, it is less irritating to the skin than 2-hydroxyethyl acrylate (or methacrylate); and fourthly, it imparts flexibility to the radiation-curable resin composition.

Examples of the resin that has a molecular weight of at least 300 and has at least one ethylenically unsaturated group in the molecule are listed below:

(1) an unsaturated polyester resin prepared by direct esterification of a system comprising (a) an unsaturated acid (for example, maleic anhydride, fumaric acid, citraconic acid, and itaconic acid), (b) a dicarboxylic acid or acid anhydride thereof (for example, phthalic anhydride, isophthalic acid, terephthalic acid, tetrahydrophthalic anhydride, hexahydrophthalic anhydride, succinic acid, adipic acid, azelaic acid, sebacic acid, tetrachlorophthalic anhydride, and endomethylenetetrahydrophthalic anhydride) and (c) a glycol (for example, ethylene glycol, propylene glycol, 1,4-butylene glycol, 1,3-butylene glycol, 2,3-butylene glycol, diethylene glycol, dipropylene glycol, triethylene glycol, 1,5-pentanediol, 1,6-hexanediol, neopentyl glycol, hydrogenated bisphenol A, glycerin, trimethylolpropane, pentaerythritol diallyl ether, and glycerin monoallyl ether);

(2) a polyester-(meth)acrylate resin prepared by direct esterification of a system comprising (a) a polyol (for example, ethylene glycol, propylene glycol, diethylene glycol, dipropylene glycol, 1,4-butylene glycol, 1,3-butylene glycol, 1,6-hexanediol, neopentyl glycol, hydrogenated bisphenol A, glycerin, trimethylolpropane, pentaerythritol, dipentaerythritol, and tris(2-hydroxyethyl)isocyanurate), (b) a polybasic acid or acid anhydride thereof (for example, phthalic anhydride, isophthalic acid, terephthalic acid, tetrahydrophthalic anhydride, hexahydrophthalic anhydride, succinic acid, adipic acid, azelaic acid, sebacic acid, and ω-hydroxycaproic acid) and (c) an acrylic acid or methacrylic acid in the presence of a catalyst;

(3) a urethane-(meth)acrylate resin prepared by reacting (a) a hydroxy group-containing unsaturated ester such as 2-hydroxyethyl (meth)acrylate and (b) diisocyanate (for example, TDI, MDI, XDI, HMDI, IPDI, and adducts thereof), or reacting (a) the hydroxy group-containing unsaturated ester, (b) the diisocyanate and (c) a polyester polyol [for example, polyester polyol comprising a polyol (for example, ethylene glycol, propylene glycol, diethylene glycol, dipropylene glycol, 1,4-butylene glycol, 1,3-butylene glycol, 1,6-hexanediol, neopentyl glycol, hydrogenated bisphenol A, glycerin, trimethylolpropane, pentaerythritol, dipentaerythritol, and tris(2-hydroxyethyl)isocyanurate) and a polybasic acid or acid anhydride thereof (for example, phthalic anhydride, isophthalic acid, terephthalic acid, tetrahydrophthalic anhydride, hexahydrophthalic anhydride, succinic acid, adipic acid, azelaic acid, sebacic acid, and ω-hydroxycaproic acid), and polycaprolactone polyol] or a polyether polyol (for example, polyethylene glycol, polypropylene glycol, and polytetramethylene glycol); and (4) an epoxy-(meth)acrylate resin prepared by reacting (a) an acrylic acid or methacrylic acid with (b) a bisphenoldiglycidyl ether having a following formula:

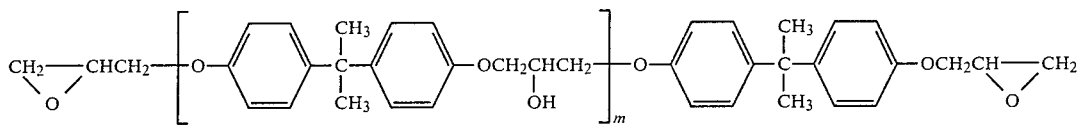

(for example, Epikote 827, Epikote 828 and Epikote 1001, produced by Shell International Chemicals Corp.), glycidyl ester having a following formula:

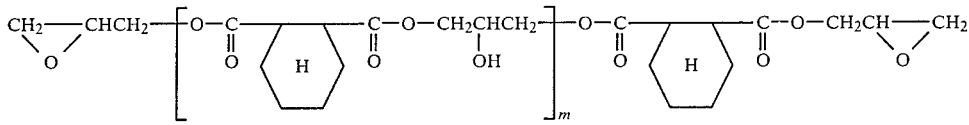

(for example, Araldite CY-175 and Araldite CY-76, produced by Ciba-Geigy AG), or alicyclic epoxy resin having at least two epoxy groups in the molecule (for example, 3,4-epoxycyclohexylmethyl-3',4'-epoxycyclohexylcarboxylate having a following formula:

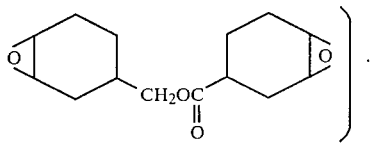

Preferred resins are the polyester-(meth)acrylate resin, the urethane-(meth)acrylate resin and the epoxy(meth)acrylate resin.

Each of these unsaturated resins has as its major component an oligomer or polymer having at least one, preferably at least two, ethylenically unsaturated groups in the molecule thereof.

The resin with an ethylenically unsaturated group has a molecular weight of at least 300, preferably between 300 and 5,000. If its molecular weight is less than 300, it does not have high film-forming ability. If the molecular weight is extremely high, the viscosity of the resin composition becomes too high to be spread easily, and it will not be firmly adhered to the substrate.

The unsaturated resins listed above may be used alone or in combination, and if desired or necessary, they may be used in combination with polyol polyacrylates having relatively low skin irritation such as trimethylolpropane triacrylate or pentaerythritol triacrylate.

The ε-caprolactone modified 2-hydroxyethyl acrylate (or methacrylate) having the above noted formula consists essentially of 1 mole of 2-hydroxyethyl acrylate (or methacrylate) having an average of 1 to 10 moles of ε-caprolactone added thereto. While there is no particular limitation on the ratio in which the resin having an ethylenically unsaturated group is mixed with the ε-caprolactone modified 2-hydroxyethyl acrylate (or methacrylate), the ratio of 95 to 40 wt% of the unsaturated resin to 5 to 60 wt% of the modified 2-hydroxyethyl acrylate (or methacrylate) is selected in the present invention. For providing good film-forming property and high curing rate, the ratio of 90 to 50 wt% of a (meth)acrylate-type resin to 10 to 50 wt% of the modified 2-hydroxyethyl acrylate (or methacrylate) is preferred.

Any conventional photosensitizer may be used in the present invention and illustrative photosensitizers include benzoin, benzoin methyl ether, benzoin isopropyl ether, acetophenone, benzophenone, anthraquinone, and combinations of benzophenone or its derivatives with amines. These compounds may be used individually or in combination. The photosensitizers are used in an amount of 0.1 to 10 parts by weight per 100 parts by weight of the mixture of the unsaturated resin and the modified 2-hydroxyethyl acrylate (or methacrylate). If less than 0.1 part by weight of the photosensitizer is used, the resulting radiation-curable resin composition takes a prolonged time to cure, and if more than 10 parts by weight of the sensitizer is used, no commensurate advantage is obtained, on the contrary, undesired effects such as film staining or reduced film-forming capability occur.

The radiation-curable resin composition of the present invention may contain dyes, pigments, glass fibers, fillers and other additives to the extent that they do not impair the radiation-curing capability of the resin. Having the features described above, the radiation-curable resin composition of the present invention can be used with advantage in printing inks, paints, adhesives and transparent moldings that cure upon exposure to UV radiation or electron beams.

The present invention is now described in greater detail by reference to the following examples and comparative examples which are given here for illustrative purposes only and are by no means intended to limit the scope of the invention. In the examples and comparative examples, all parts are by weight.

EXAMPLES 1 AND 2 AND COMPARATIVE EXAMPLE 1

A 3000-ml four-necked flask was charged with 1900 g of an alicyclic epoxy resin, 3,4-epoxycyclohexylmethyl-3',4'-epoxycyclohexane carboxylate (Celloxide 2021 of Daicel Chemical Industries, Ltd.), 720 g of acrylic acid, 7.2 g of an amine catalyst (i.e., diethylamine) and 10 g of hydroquinone, and the mixture was heated at 110°–130° C. for about 2 hours under stirring, whereupon an epoxy-acrylate resin having an acid value of 3.0 was formed. The resin had a molecular weight of 417 and a viscosity of about 500 poise at 50° C. It was a yellowish brown syrup which could not be spread on a substrate immediately.

Eighty parts of the epoxy-acrylate resin was uniformly dissolved in 20 parts of ε-caprolactone modified 2-hydroxyethyl acrylate A (Example 1; A being an adduct of 1 mole of 2-hydroxyethyl acrylate and an average of 1 mole of ε-caprolactone), or B (Example 2; B being an adduct of 1 mole of 2-hydroxyethyl acrylate and an average of 2 moles of ε-caprolactone) or 2- hydroxyethyl acrylate. To the respective solutions, 2 parts of benzoin methyl ether was added to prepare three samples of radiation-curable resin composition. The physical properties and performance characteristics of the samples are listed in Table 1, from which one can see that the samples of the present invention had reduced skin irritation and increased flexibility without sacrificing their physical properties and performance characteristics.

The ϵ-caprolactone modified 2-hydroxyethyl acrylate or methacrylate may be prepared by using a stannous halide (e.g. stannous chloride or stannous bromide) as a catalyst (see commonly assigned Japanese Patent Application (OPI) 195714/82 (corresponding to U.S. Patent Application Ser. No. 373,306 filed on Apr. 29, 1982; British Patent Application No. 8213533 filed on May 11, 1982; and West German Patent Application No. P32 17 653.8 filed on May 11, 1982)).

age of 1 mole of ϵ-caprolactone), or B (Example 4; B being an adduct of 1 mole of 2-hydroxyethyl arylate and an average of 2 moles of ϵ-caprolactone) or 2-hydroxyethyl acrylate. To the respective solutions, 4 parts of Iregacure 651 (produced by Ciba-Geigy AG) as a photosensitizer was added to prepare three samples of radiation-curable resin composition. The physical properties and performance characteristics of the samples are listed in Table 2, from which one can see that the samples of the present invention had reduced skin irritation and increased flexibility without sacrificing their physical properties and performance characteristics.

TABLE 2

|  | Comparative Example 2 | Example 3 | Example 4 |
| --- | --- | --- | --- |
| Composition |  |  |  |
| Urethane-acrylate resin | 75 | 75 | 75 |
| 2-Hydroxyethyl acrylate | 25 | — | — |
| ϵ-Caprolactone modified 2-hydroxyethyl acrylate A | — | 25 | — |
| ϵ-Caprolactone modified 2-hydroxyethyl acrylate B | — | — | 25 |
| Iregacure 651 | 4 | 4 | 4 |
| Physical properties and performance characteristics |  |  |  |
| Viscosity (poise/25° C.) | 3.33 | 8.78 | 12.5 |
| Curing speed (sec) | 2 | 2 | 2 |
| Pencil hardness | H | B | 2B |
| Abrasion resistance (cutting squares or cross-hatching) | 50/100 | 50/100 | 50/100 |
| Flexing resistance (2 mm) | good | good | good |
| Impact resistance (Du Pont tester 100 g ½ inch) | 50 cm | 50 cm | 50 cm |
| Skin irritation (patch test in 1/10 conct.) | red spots in 24 hr | no change in 24 hr | no change in 24 hr |

The substrate was a cold-rolled steel plate having 20-30 μm thick coating.
Coating was cured by exposure to 200 W/in illumination 15 cm apart.

EXAMPLES 5 AND 6 AND COMPARATIVE EXAMPLE 3

Phthalic anhydride was reacted with 1,6-hexanediol to produce a polyester polyol resin. Then, acrylic acid was reacted to terminals of the polyester polyol resin to produce a polyester-acrylate resin.

TABLE 1

|  | Comparative Example 1 | Example 1 | Example 2 |
| --- | --- | --- | --- |
| Composition |  |  |  |
| Epoxy-acrylate resin | 80 | 80 | 80 |
| 2-Hydroxyethyl acrylate | 20 | — | — |
| ϵ-Caprolactone modified 2-hydroxyethyl acrylate A | — | 20 | — |
| ϵ-Caprolactone modified 2-hydroxyethyl acrylate B | — | — | 20 |
| Benzoinmethyl ether | 2 | 2 | 2 |
| Physical properties and performance characteristics |  |  |  |
| Viscosity (poise/25° C.) | 40 | 140 | 250 |
| Curing speed (sec) | 3-4 | 5-6 | 7-8 |
| Pencil hardness | 3H | 2H | 2H |
| Abrasion resistance (cutting squares or cross-hatching) | 0/100 | 0/100 | 0/100 |
| Flexing resistance (10 mm) | no good | good | good |
| Impact resistance (Du Pont tester 300 g ½ inch) | 25 cm | 30 cm | 35 cm |
| Skin irritation (patch test in 1/10 conct.) | red spots in 24 hr | no change in 24 hr | no change in 24 hr |

The substrate was a cold-rolled steel plate having 20-30 μm thick coating.
Coating was cured by exposure to 200 W/in (watt/inch) illumination 15 cm apart.

EXAMPLES 3 AND 4 AND COMPARATIVE EXAMPLE 2

Adipic acid was reacted with 1,6-hexanediol to produce a polyester polyol resin. The resulting polyester polyol resin was reacted with hexamethylene diisocyanate and 2-hydroxyethyl acrylate to produce a urethane-acrylate resin.

75 parts of the urethane-acrylate resin was uniformly dissolved in 25 parts of ϵ-caprolactone modified 2-hydroxyethyl acrylate A (Example 3; A being an adduct of 1 mole of 2-hydroxyethyl acrylate and an average of 1 mole of ϵ-caprolactone), or B (Example 6; B being an adduct of 1 mole of 2-hydroxyethyl acrylate and an average of 2 moles of ϵ-caprolactone) or 2-hydroxyethyl acrylate. To the respective solutions, 3 parts of Darocur 1173 (produced by Merck Co.) as a photosensitizer was added to prepare three samples of radiation-curable resin composition. The physical properties and performance characteristics of the samples are listed in Table 3, from which one can see that the samples of the present invention had reduced skin irritation and increased flexibility without sacrificing their physical properties and performance characteristics.

TABLE 3

|  | Comparative Example 3 | Example 5 | Example 6 |
|---|---|---|---|
| Composition |  |  |  |
| Polyester-acrylate resin | 80 | 80 | 80 |
| 2-Hydroxyethyl acrylate | 20 | — | — |
| ε-Caprolactone modified 2-hydroxyethyl acrylate A | — | 20 | — |
| ε-Caprolactone modified 2-hydroxyethyl acrylate B | — | — | 20 |
| Darocur 1173 | 3 | 3 | 3 |
| Physical properties and performance characteristics |  |  |  |
| Viscosity (poise/25° C.) | 22.6 | 72.4 | 130.8 |
| Curing speed (sec) | 2 | 2 | 2 |
| Pencil hardness | 2H | H | HB |
| Abrasion resistance (cutting squares or cross-hatching) | 0/100 | 0/100 | 0/100 |
| Flexing resistance (2 mm) | good | good | good |
| Impact resistance (Du Pont tester 500 g ½ inch) | 50 cm | 50 cm | 50 cm |
| Skin irritation (patch test in 1/10 conct.) | red spots in 24 hr | no change in 24 hr | no change in 24 hr |

The substrate was a cold-rolled steel plate having 20–30 μm thick coating.
Coating was cured by exposure to 200 W/in illumination 15 cm apart.

While the invention has been described in detail and with reference to specific embodiment thereof, it will be apparent to one skilled in the art that various changes and modifications can be made therein without departing from the spirit and scope thereof.

What is claimed is:

1. A radiation-curable resin composition comprising 0.1 to 10 parts by weight of a photosensitizer and 100 parts by weight of a mixture of 40 to 95 wt% of a resin having a molecular weight of at least 300 and at least one ethylenically unsaturated group in the molecule and 60 to 5 wt% of ε-caprolactone modified 2-hydroxyethyl acrylate of methacrylate of the formula:

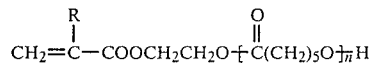

wherein
R = H or CH$_3$ and
n is 1 to 10.

2. The radiation-curable resin composition as claimed in claim 1, wherein the resin has a molecular weight of between 300 and 5,000.

3. The radiation-curable resin composition as claimed in claim 1, wherein the resin is selected from the group consisting of an unsaturated polyester resin, a polyester-(meth)acrylate resin, a urethane-(meth)acrylate resin and an epoxy-(meth)acrylate resin.

4. The radiation-curable resin composition as claimed in claim 3, wherein the resin is selected from the group consisting of a polyester-(meth)acrylate resin, a urethane-(meth)acrylate resin and an epoxy-(meth)acrylate resin.

5. The radiation-curable resin composition as claimed in claim 1, wherein the mixture comprises 50 to 90 wt% of a (meth)acrylate resin having a molecular weight of at least 300 and at least 1 ethylenically unsaturated group in the molecule and 50 to 10 wt% of the ε-caprolactone modified 2-hydroxyethyl acrylate or methacrylate.

6. The radiation-curable resin composition as claimed in claim 5, wherein the (meth)acrylate-type resin is selected from the group consisting of a polyester-(meth)acrylate resin, a urethane-(meth)acrylate resin and an epoxy-(meth)acrylate resin.

7. The radiation-curable resin composition as claimed in claim 1, wherein the photosensitizer comprises benzoin, benzoin methyl ether, benzoin isopropyl ether, acetophenone, benzophenone, anthraquinone, and combinations of benzophenone or its derivatives with amines.

* * * * *